(12) United States Patent
Peel

(10) Patent No.: US 11,402,291 B2
(45) Date of Patent: Aug. 2, 2022

(54) METHOD OF ASSESSING DAMAGE TO COMPOSITE MEMBERS

(71) Applicant: BENTLEY MOTORS LIMITED, Crewe (GB)

(72) Inventor: Martin Robert Peel, Nantwich (GB)

(73) Assignee: Bentley Motors Limited, Crewe (GB)

( * ) Notice: Subject to any disclaimer, the term of this patent is extended or adjusted under 35 U.S.C. 154(b) by 849 days.

(21) Appl. No.: 16/305,359

(22) PCT Filed: Jun. 7, 2017

(86) PCT No.: PCT/GB2017/051647
§ 371 (c)(1),
(2) Date: Nov. 28, 2018

(87) PCT Pub. No.: WO2017/216520
PCT Pub. Date: Dec. 21, 2017

(65) Prior Publication Data
US 2020/0319056 A1    Oct. 8, 2020

(30) Foreign Application Priority Data
Jun. 16, 2016   (GB) .................................. 1610511.6

(51) Int. Cl.
*G01M 3/26*      (2006.01)
*G01N 21/88*     (2006.01)
*G01N 23/00*     (2006.01)

(52) U.S. Cl.
CPC .............. *G01M 3/26* (2013.01); *G01N 21/88* (2013.01); *G01N 23/00* (2013.01)

(58) Field of Classification Search
CPC .... G01M 3/26; G01M 5/0033; G01M 3/3263; G01M 3/32; G01M 3/34; G01N 21/88; G01N 23/00; G01N 19/08

(Continued)

(56) References Cited

U.S. PATENT DOCUMENTS 5,239,859 A * 8/1993 Lehmann ............... B07C 5/3408
                                                73/49.2
5,361,622 A * 11/1994 Wall ..................... G01M 3/2815
                                                73/49.1

(Continued)

FOREIGN PATENT DOCUMENTS

CN      102692429 A      9/2012
DE   102007014160 A1     9/2008

(Continued)

OTHER PUBLICATIONS

Japanese Patent Application No. 2018-563097; Notice of Reasons for Refusal; May-18-2021.

(Continued)

*Primary Examiner* — Marrit Eyassu
(74) *Attorney, Agent, or Firm* — Schwabe Williamson & Wyatt, P.C.

(57) ABSTRACT

A method of assessing damage to a composite member requires the formation of a composite member comprising at least one cavity. A first pressure differential is then established between the cavity and the surrounding ambient pressure. The rate of change of the pressure differential over a first predetermined period is monitored and then the pressure differential is allowed to subside. The result of the monitoring step is stored as a reference value, so that after the composite member is damaged, or after it has been in service for a predetermined time, the test can be repeated and compared with the reference value. If the result of the repeated monitoring differs from the reference value by more than a predetermined amount, it is determined that the composite member is defective.

20 Claims, 3 Drawing Sheets

(58) Field of Classification Search
USPC .............................................................. 73/40
See application file for complete search history.

(56) References Cited

U.S. PATENT DOCUMENTS

| | | | |
|---|---|---|---|
| 5,438,861 A | 8/1995 | Sisbarro et al. | |
| 5,831,147 A * | 11/1998 | Hoath | G01M 3/202 |
| | | | 73/49.3 |
| 6,715,365 B2 * | 4/2004 | Davey | G01N 19/08 |
| | | | 73/799 |
| 7,176,448 B2 | 2/2007 | Ogisu et al. | |
| 7,942,032 B2 | 5/2011 | Walker et al. | |
| 2002/0029614 A1 * | 3/2002 | Davey | G01M 3/3254 |
| | | | 73/37 |
| 2005/0109082 A1 | 5/2005 | Stewart | |
| 2009/0078357 A1 | 3/2009 | Laxton | |
| 2011/0036149 A1 | 2/2011 | Bach et al. | |
| 2011/0089958 A1 | 4/2011 | Malecki et al. | |
| 2013/0294884 A1 | 11/2013 | Huillet | |
| 2014/0151578 A1 | 6/2014 | Glavind et al. | |
| 2016/0091388 A1 * | 3/2016 | De Baere | G01M 3/26 |
| | | | 73/40 |

FOREIGN PATENT DOCUMENTS

| | | |
|---|---|---|
| DE | 102008021248 A1 | 11/2009 |
| DE | 102013103773 B3 | 6/2014 |
| EP | 0343990 A2 | 11/1989 |
| GB | 1535920 A | 12/1978 |
| JP | 2008-196527 A | 8/2008 |
| JP | 2010-025577 A | 2/2010 |
| JP | 2014-147643 A | 8/2014 |
| KR | 200449764 Y1 * | 8/2010 |
| KR | 201 10122433 A | 11/2011 |
| KR | 201 40034363 A | 3/2014 |
| WO | WO2007104110 A1 | 9/2007 |
| WO | WO2007112512 A1 | 10/2007 |
| WO | WO2013086626 A1 | 6/2013 |

OTHER PUBLICATIONS

Japanese Patent Application No. 2018-563097; Notice of Reasons for Refusal; Mar-29-2022.

* cited by examiner

METHOD OF ASSESSING DAMAGE TO COMPOSITE MEMBERS

CROSS REFERENCE TO RELATED APPLICATIONS

The present application is a national phase entry under 35 U.S.C. § 371 of International Application No. PCT/GB2017/051647, filed Jun. 7, 2017, entitled "METHOD OF ASSESSING DAMAGE TO COMPOSITE MEMBERS," which designated, among the various States, the United States of America, and which claims priority to GB 1610511.6 filed Jun. 16, 2016, both of which are hereby incorporated by reference.

TECHNICAL FIELD OF THE INVENTION

The present invention relates to a method of assessing damage to composite members; that is to say, assessing damage to members made of composite materials, such as fibre reinforced plastics, reinforced thermoplastics, carbon-based composites and the like. In particular, but not exclusively, the invention concerns assessing damage to composite components of vehicles, especially automobiles.

BACKGROUND TO THE INVENTION

Several methods are known for assessing damage to composite members. The most well-known (and crudest) is to simply visually inspect a composite member and assess whether it appears to be damaged or not. For example after a vehicle, such as an automobile, crashes mechanics will typically visually inspect composite components, such as panels to assess whether they have been damaged. Sometimes this damage is obvious—panels will often snap and break into several pieces. At other times, structural damage can be caused that cannot be seen.

Another method for assessing damage to composite members, especially for dealing with damage to a surface which cannot be seen, caused by an impact to a surface which can be seen is described in US2009/0173139. According to this method, a structure is provided with a sensor having a body portion that has a surface provided with at least one channel, the surface of the body portion is affixed to a surface which cannot be seen, such that a conduit is formed by the channel and the second surface and a pressure differential is established between the conduit and a reference pressure adjacent the at least one conduit, then, to determine whether the surface is damaged, the pressure is monitored for a change in pressure differential of the at least one conduit.

This method suffers certain disadvantages. In particular, it calls for a sensor to be affixed to the composite panel and hermetically sealed thereto, and for the conduit formed by the sensor and the panel to be plumbed to a monitoring instrument. Moreover a differential pressure (either positive or negative) must be applied to the second surface of the composite panel.

The requirement for a sensor and a monitoring instrument to be attached and plumbed respectively to the composite panel adds weight and complexity. This is particularly important in automotive applications, but also elsewhere, because composites are typically used in place of traditional components because of their low weight, which is obviated by adding components. Moreover, many composites are already expensive to produce, so additional expense is to be avoided, and in addition, extra, non-structural components, take up space which is also frequently at a premium, especially in performance automobiles.

Finally, the prolonged application of differential pressure to one side of a component, intended by the method of US2009/0173139, which monitors for a change in state of pressure in, or flow through, the conduit, could in itself cause damage, especially where components are particularly delicate.

The present invention seeks to provide an improved method of assessing damage to composite members.

SUMMARY OF THE INVENTION

According to a first aspect of the invention, there is provided a method of assessing damage to a composite member comprising: providing a composite member comprising at least one cavity; establishing a first pressure differential between the at least one cavity and the surrounding ambient pressure; monitoring the rate of change of the pressure differential over a first predetermined period; and allowing the pressure differential to subside (preferably such that the pressure in the cavity becomes equal to ambient pressure); the method characterised by storing the result of the monitoring step as a reference value for said composite member; and repeating the steps of establishing a pressure differential between the at least one cavity of said composite member and the surrounding ambient pressure; monitoring the rate of change of the pressure differential over a predetermined period; allowing the pressure differential to subside (preferably such that the pressure in the cavity becomes equal to ambient pressure); and comparing the result of the repeated monitoring step for said composite member with the reference value for said composite member; and if the result of the repeated monitoring step differs from the reference value by more than a predetermined amount, determining that the composite member is defective.

Those skilled in the art will appreciate that the expression "composite member" means a member formed from a composite material. The composite material may comprise a reinforcement such as fibre and a binder such as resin, and may be fibre reinforced plastics, reinforced thermoplastics, carbon based composites or the like.

This method has several advantages over the prior art. For example, since the pressure differential is allowed to subside, the composite member is not kept at an elevated or reduced pressure over time; this reduces stress on the composite member. Moreover, composite members often have variable amounts of initial leakage, i.e. two identical members, both suitable for the same function may have quite different original rates of change of pressure differential over the first predetermined period, but may still both be suitable for their intended purpose—typically the function of the composite member is not to contain fluid; the cavity is only formed for test purposes. Accordingly, the initial leakage may not be a good indication of the structural integrity of the device. However, a reduction in structural integrity, caused by damage etc., will be accompanied by a substantial decrease in the rate of change of the pressure differential. Therefore, when the test is repeated, the comparison with the original value is a much better determiner of whether the component is damaged and needs replacing, than comparison with any arbitrary absolute value.

The method may comprise carrying out further checks on the acceptability of the composite member, for example by x-ray or laser shearography. Such checks may be conducted before the steps are repeated, and may be conducted before the composite member is installed in a vehicle, such as an automobile, they may be carried out before the initial monitoring step.

Conducting such additional steps, which are normally used to assess damage can act as an additional backup to ensure that parts of the composite member that might be defective owing to an error in the manufacturing process can be detected in addition to detecting defects caused over time.

For example, as another further check, the method may comprise measuring the rate of pressure increase when establishing a first pressure differential between the at least one cavity and the surrounding ambient pressure. A particularly high rate may indicate blocked cavities/pipes (or connection to the wrong component) and a low rate of increase could indicate cracks/apertures or again connection to the wrong component. Moreover, the method may comprise comparing the rate of establishing a first pressure differential with a previously established reference value for establishing the first pressure differential. The method may comprise establishing a reference value for rate of increase, by monitoring the rate of pressure increase over a predetermined period as a compressed fluid is introduced into the component to establish the first pressure differential.

The first pressure differential may be a predetermined pressure differential.

The repeated pressure differential may be the same as the first pressure differential.

The repeated period may be the same as the first predetermined period.

The result of the monitoring step may be stored as a differential pressure value reached after the predetermined period.

The result of the monitoring step may be stored as a rate of change of pressure differential.

The method may comprise putting the composite member into active use after storing the reference value and before repeating the steps of establishing a pressure differential between the at least one cavity and the surrounding ambient pressure; monitoring the rate of change of the pressure differential over a predetermined period; and comparing the result of the repeated monitoring step with the reference value.

The characterising steps may be repeated after an incident, e.g., if the composite member is a component of a vehicle, after that vehicle has been involved in a crash. This is useful for ascertaining whether non-visible damage has been caused by the crash and determining whether it is necessary to replace a part.

The characterising steps may be repeated after a predetermined period, e.g. after the composite member has been in service for a predetermined time.

For example, the method may comprise waiting at least one day after storing the reference value and before repeating the steps of establishing a pressure differential between the at least one cavity and the surrounding ambient pressure; monitoring the rate of change of the pressure differential over a predetermined period; and comparing the result of the repeated monitoring step with the reference value.

Alternatively, the method may comprise waiting at least one week after storing the reference value and before repeating the steps of establishing a pressure differential between the at least one cavity and the surrounding ambient pressure; monitoring the rate of change of the pressure differential over a predetermined period; and comparing the result of the repeated monitoring step with the reference value.

Alternatively, the method may comprise waiting at least one month after storing the reference value and before repeating the steps of establishing a pressure differential between the at least one cavity and the surrounding ambient pressure; monitoring the rate of change of the pressure differential over a predetermined period; and comparing the result of the repeated monitoring step with the reference value.

Alternatively, the method may comprise waiting at least one year after storing the reference value and before repeating the steps of establishing a pressure differential between the at least one cavity and the surrounding ambient pressure; monitoring the rate of change of the pressure differential over a predetermined period; and comparing the result of the repeated monitoring step with the reference value.

The characterising steps may be repeated according to a service schedule, e.g. if the composite member is a component of a vehicle, after that vehicle has travelled a predetermined number of miles.

The characterising steps may be repeated more than once, in accordance with a service schedule. These options are useful for determining whether non-visible damage has been caused over time, for example due to fatigue loading.

The reference value may be stored electronically, for example in a manufacturer's database and may be accessible via an internet, intranet, or the like. Alternatively, the reference value may be stored manually and printed on, or attached to the component.

The method may be applied to a plurality of composite members, and each reference value may be associated with a unique ID associated with the respective one of the plurality of composite members.

The reference value may be compared to a threshold value (e.g. a maximum reduction in pressure over the first predetermined period, or a maximum average rate of change of pressure over the first predetermined period) and if it exceeds the threshold value, the respective component may be rejected for use.

The method may comprise the step of determining that the composite member is defective if the reference value exceeds a predetermined absolute threshold value.

The method may further comprise the steps of, after storing the result of the monitoring step as a reference value, installing the composite member as a component part of a vehicle, and storing the reference value in a database associated with the vehicle in which the part is installed.

The method may comprise the steps of: establishing a first pressure differential between the at least one cavity and the surrounding ambient pressure; monitoring the rate of change of the pressure differential over a first predetermined period; and allowing the pressure differential to subside; and storing the result of the monitoring step as a reference value prior to installation of the composite member in a vehicle and/or after installation in a vehicle.

The method may further comprise the steps of repairing or replacing a defective component comprising a cavity; and establishing a first pressure differential between the at least one cavity in the replaced/repaired component and the surrounding ambient pressure; monitoring the rate of change of the pressure differential over a first predetermined period; and allowing the pressure differential to subside; and storing the result of the monitoring step as a new reference value.

The method may comprise replacing the reference value in the database with the new reference value.

The method may comprise repeating the steps of establishing a pressure differential between the at least one cavity and the surrounding ambient pressure; monitoring the rate of change of the pressure differential over a predetermined period; and allowing the pressure differential to subside; then comparing the result of the repeated monitoring step with the new reference value; and if the result of the repeated monitoring step differs from the reference value by more than a predetermined amount, determining that the composite member is defective.

The pressure differential may be established by pumping a fluid into the cavity. The fluid may be air, water or helium.

The cavity may be formed in a region where damage to the composite member would be critical to its safe function.

The composite member may be a component of an automobile body.

The composite member may be a component of an automobile chassis structure.

Alternatively, and preferably, the composite member may be a wheel or a component of a wheel, in particular an automotive wheel.

The composite member may be a component of a vehicle other than an automobile, such as part of an aeroplane, for example, a rib of a wing. Alternatively, the composite member may be a different structure, or component of a structure/system; it could even extend to composite materials such as reinforced concrete, in which case, the composite member could be a bridge, a building, or a component of a bridge or building.

A second aspect of the invention provides a test apparatus comprising a connector for connection to an opening of a cavity of a composite member, apparatus for creating a pressure differential between the cavity and the surrounding environment, a sensor for sensing a change in pressure differential, and a processor adapted to implement the method set out above, optionally including the optional features thereof.

DETAILED DESCRIPTION OF THE INVENTION

In order that the invention may be more clearly understood an embodiment thereof will now be described, by way of example only, with reference to the accompanying drawings, of which:

Figure 1:
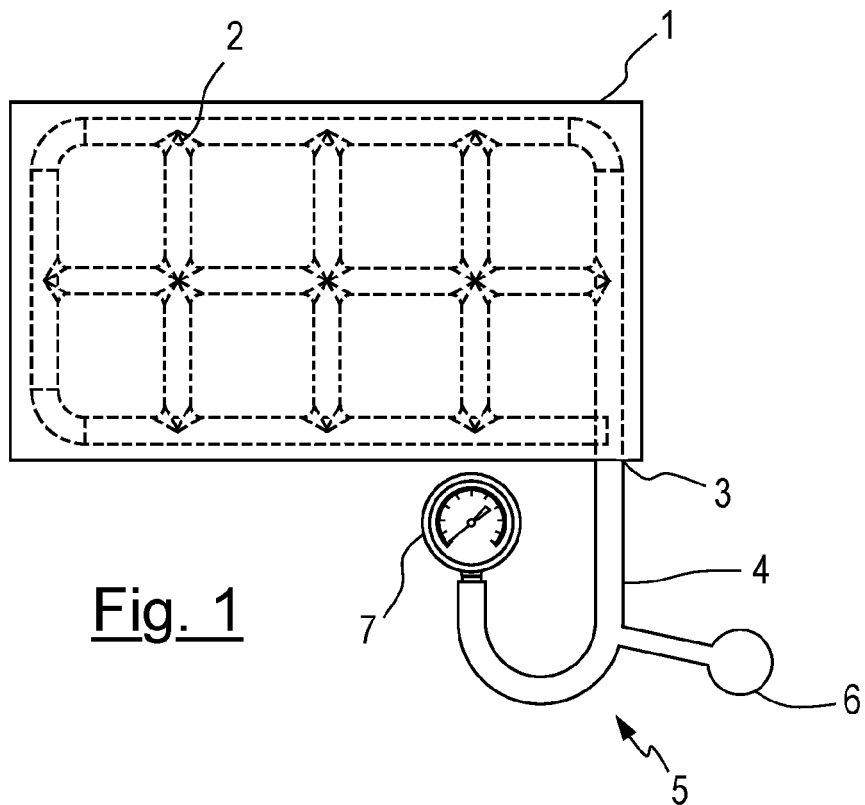
FIG. 1 shows a front view of a composite member, in which internal features are shown in dashed lines, attached to a piece of test equipment.
Figure 2:
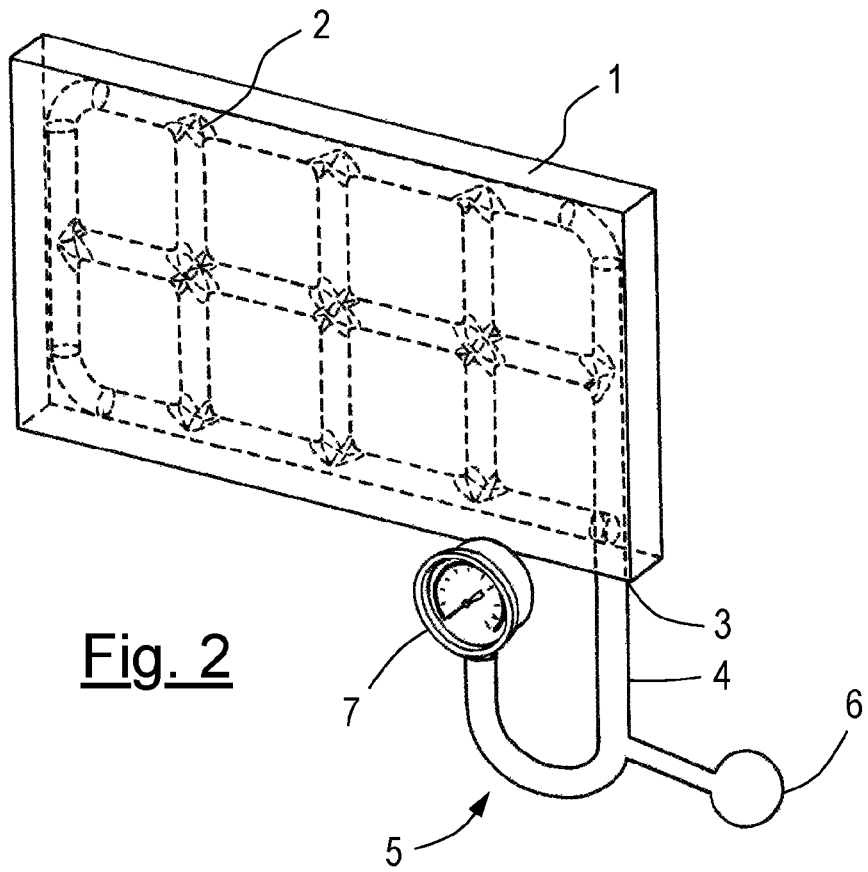
FIG. 2 shows a perspective view of the composite member of FIG. 1, in which internal features are shown in dashed lines, attached to a piece of test equipment.

As illustrated in FIG. 1, an exemplary composite member 1, which may be assessed by the method of the invention comprises a body, in this case of cuboid form, formed from a composite material, such as fibre reinforced plastics, reinforced thermoplastics, carbon based composites or the like by conventional means. Within the body, a cavity 2 is formed. In the particular example, the cavity 2 is formed as a network of connected tubes. The tubes are strategically placed adjacent to regions of the composite member where damage would be critical to its safe function.

Figure 3:
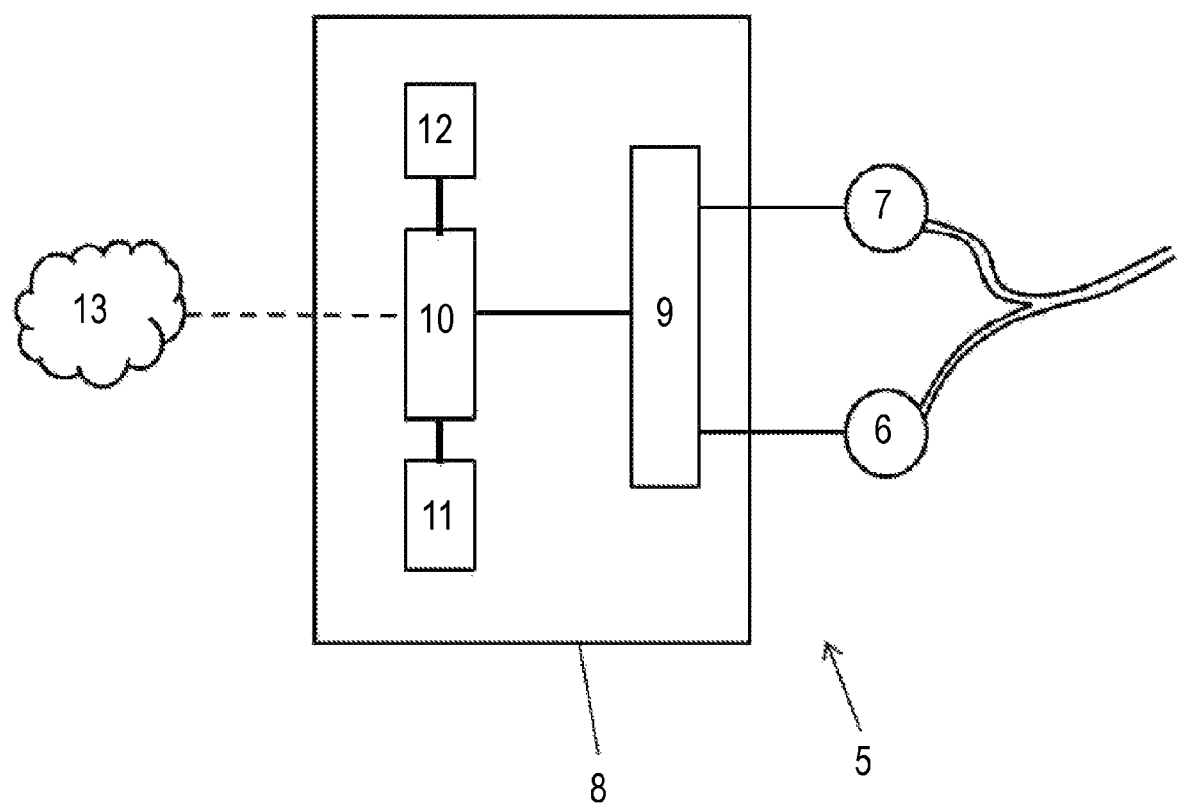
FIG. 3 shows a schematic diagram of an automated test unit for conducting the method of the invention.

At one corner of the composite member 1, an opening 3 is formed, which comprises a suitable socket (not shown), e.g. with a screw thread, into which the e.g. externally threaded connector of the tubing 4 of a test apparatus 5 can be connected. The test apparatus comprises a compressor 6 connected to tubing 4, which is also provided with a pressure sensor 7. The pressure sensor 7 is shown schematically as an analogue gauge, but in practice, the method is preferably automated, in which case, both the measurement of pressure and the pumping of fluid into the composite member 1 would be computer controlled by a monitoring unit 8 as shown in FIG. 3.

The monitoring unit 8 comprises a communications unit 9, which sends signals to the compressor 6 and receives signals from the pressure sensor 7 (for example through a wired connection, WIFI® or the like; a processor 10, which processes the signals received from the sensor 7, and other inputs 11, e.g. user actuable input device, such as a mouse, button, or touch screen, or barcode/RFID scanner according to instructions saved in a memory 12. The processor 10 outputs information to a database, which may be stored, for example in "the cloud" 13.

The monitoring unit 8 is operable to carry out the method 20 described below, with reference to FIG. 4.

Figure 4:
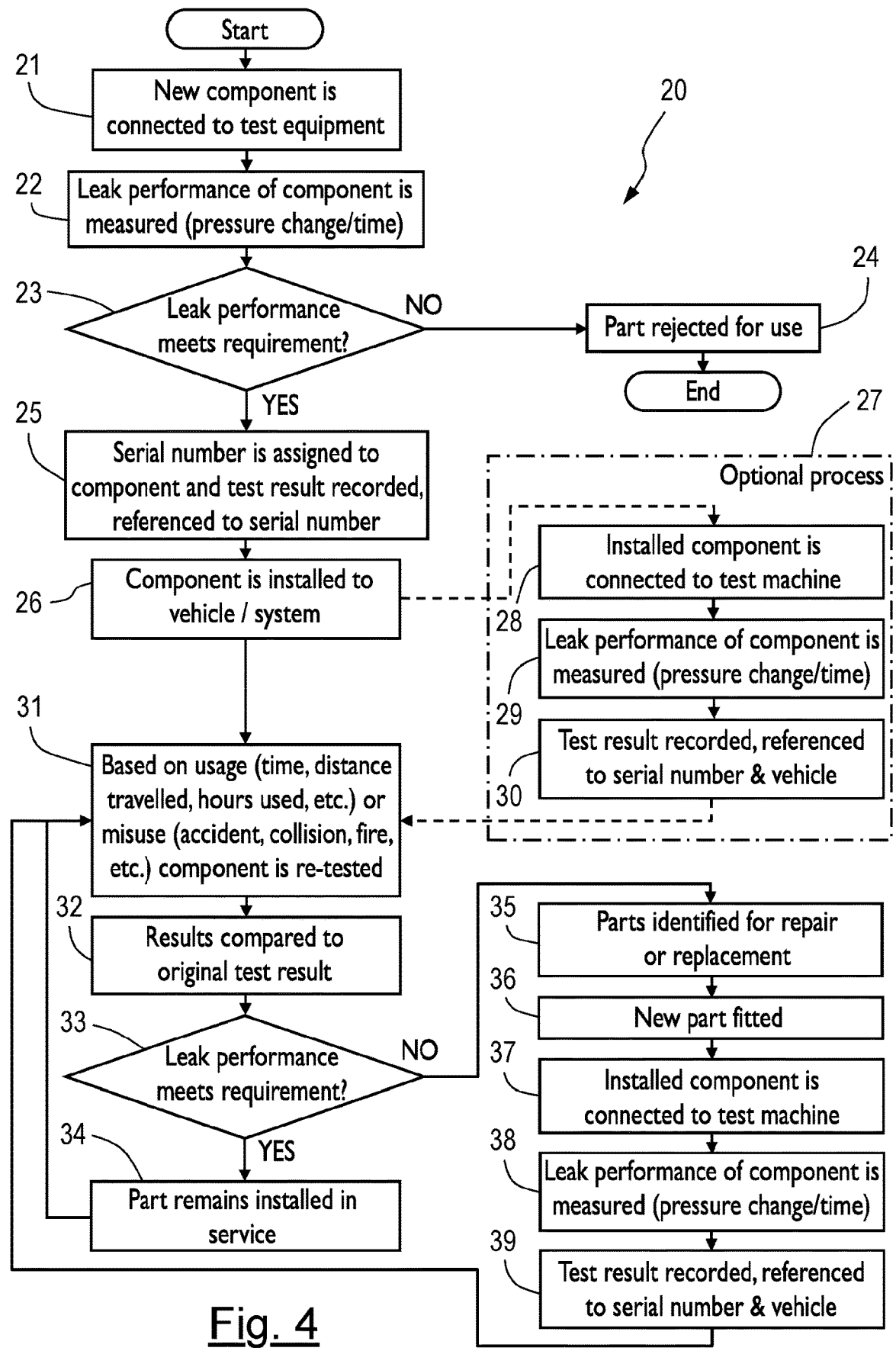
FIG. 4 shows a flow chart in accordance with the method of an embodiment of the invention.

According to the method 20 of an embodiment of the invention shown in FIG. 4, once a composite member 1 is formed with a cavity therein, at step 21, an operator, e.g. in the quality control department of a manufacturer connects the test apparatus to the composite member, then at step 22 the leak performance of the component is measured. To measure the leak performance, the processor 10 sends a signal via the communications unit 9 to the compressor 6 to cause it to pump compressed fluid, in this case air, into the component 1, simultaneously the processor 10 monitors the pressure in the component as sensed by the sensor 7 and, once a predetermined pressure $P_1$ is reached (whereby a pressure differential between the cavity and the surrounding air pressure has been generated), the processor 10 sends a signal to the compressor 6 causing it to cease from pumping air into the composite member 1. The test apparatus 5 then monitors the rate of change of the pressure differential over a first predetermined period $T_1$, of course the precise rate of change may not be linear, but as defined herein, the rate of change of the pressure differential is to be understood broadly, including an estimated average rate of change of the pressure differential, which may be obtained by subtracting the pressure $P_2$ at the end of the predetermined period from the predetermined pressure $P_1$ at the start of the predetermined period and dividing by the predetermined period $T_1$.

In step 23, the estimated average rate of change of pressure differential is then compared with a threshold value and if it exceeds the threshold value—i.e. if the rate of change is higher than the threshold value, in step 24, the part is rejected for use.

The threshold value may be dependent on ambient pressure, which may be estimated and input to the monitoring unit 8 via the input 11, such as a user actuable input device and stored in memory 12, or may be determined by the sensor 7 when it is not connected to a composite member, e.g. as part of a start-up process. Varying the threshold value according to the ambient pressure allows for the difference in the rate of change of pressure differential which would occur for the same component at the same original pressure $P_1$, because the initial differential will be higher where ambient pressure is lower (e.g. at higher altitude).

If, in step 23 it is determined that the estimated average rate of change of the pressure differential does not exceed a threshold value (which could be achieved simply by comparing the pressure at the end of the predetermined period $P_2$ with a threshold pressure, given that the predetermined pressure and the predetermined period are known), it is determined that the leak performance of the composite member meets the minimum requirement and further processing may continue.

Thus, the pressure differential may be allowed to subside by disconnecting the test apparatus 5, opening a valve, or (least preferably) simply waiting. Then, at step 25 the result of the monitoring step 23 is stored as a reference value. Of course, it will be appreciated that there are many different ways of storing the reference value—for example, the final pressure value could be stored, the rate of change of pressure could be stored, or a more comprehensive set of data could be stored, for example, the predetermined period $T_1$, the predetermined pressure $P_1$ the pressure $P_2$ at the end of the predetermined period and the ambient pressure where the test was conducted.

As set out in FIG. 4, step 25, at the same time as recording the test result as a reference value, a serial number (ID number) can be assigned to the component. This could be written to an RFID tag, or the like on the component, or could be printed and applied to the component. Alternatively, the component could already have a serial number stored in a database, for example in an intranet or cloud 13 and the reference value could be stored in a field associated with that serial number.

In the present embodiment of the invention, at step 26, the composite member is installed in a vehicle (in other embodiments, the composite member may take on a different role) and an optional process 27 is followed. In this optional process for vehicles, in particular automobiles (not shown), after installation at step 26, in step 28 the composite member 1 is once again connected to the test apparatus 5.

Thereafter, in step 29, the leak performance of the component is measured once again. The same process that was carried out before installation in the vehicle is carried out again: that is to say, to measure the leak performance, the processor 10 sends a signal via the communications unit 9 to the compressor 6 to cause it to pump compressed fluid, in this case air, into the component 1, simultaneously the processor 10 monitors the pressure in the component as sensed by the sensor 7 and, once a predetermined pressure $P_1$ is reached (whereby a pressure differential between the cavity and the surrounding air pressure has been generated), the processor 10 sends a signal to the compressor 6 causing it to cease from pumping air into the composite member 1. The test apparatus 5 then monitors the rate of change of the pressure differential over a first predetermined period $T_1$. Once again, the rate of change may again be obtained by subtracting the pressure $P_3$ at the end of the predetermined period from the predetermined pressure $P_1$ at the start of the predetermined period and dividing by the predetermined period $T_1$.

Then, in the final step of the optional process 27 for composite members which are installed as component parts, for example of automobiles, at step 30, the test result is recorded and referenced to the vehicle as well as the serial number of the part. Thus, an operator may, for example, scan an RFID tag associated with the vehicle and having the vehicle's VIN and/or an internal serial number associated with it, or the test apparatus may be provided with an appropriate sensor as an input device 11 to read this information and the result of the test may be uploaded to a database s stored for example in an intranet or cloud 13.

A further optional step in the optional process 27, not shown in FIG. 4 may also be carried out after step 29, whereby the result of the leak detection test carried out at step 29 on the installed component is compared to the result of the initial testing carried out before installation at step 23 and, if the results differ by more than a predetermined amount, it is determined that the component has been damaged during installation and is rejected and removed from the vehicle to be replaced by a new component, which will have been tested in the same way.

The composite member 1 is then put into active use.

As set out in step 31, based on usage or misuse, at some time after the composite member is put into use, it is retested. The retesting step may be repeated after an incident, e.g., if the composite member is a component of a vehicle, after that vehicle has been involved in a collision, accident, fire or the like, after a predetermined period, e.g. after the composite member has been in service for a predetermined time, or according to a service schedule, e.g. especially if the composite member is a component of a vehicle, after that vehicle has travelled a predetermined number of miles; whichever is earliest.

In the preferred embodiment, the same test equipment 5 is used to carry out the repeated test 31 and the same initial pressure $P_1$, the same pressure differential and the same predetermined period $T_1$ is used. Of course, those skilled in the art will appreciate that the test could be modified if a different period/differential pressure was used, an anticipation of different results. However, in the embodiment the same process is used, whereby the processor 10 sends a signal via the communications unit 9 to the compressor 6 to cause it to pump compressed fluid, in this case air, into the component 1, simultaneously the processor 10 monitors the pressure in the component as sensed by the sensor 7 and, once a predetermined pressure $P_1$ is reached (whereby a pressure differential between the cavity and the surrounding air pressure has been generated), the processor 10 sends a signal to the compressor 6 causing it to cease from pumping air into the composite member 1. The test apparatus 5 then monitors the rate of change of the pressure differential over the same first predetermined period $T_1$, and obtains a new result by subtracting the pressure $P_4$ at the end of the predetermined period from the predetermined pressure $P_1$ at the start of the predetermined period and dividing by the predetermined period $T_1$.

At step 32, the result of this repeated monitoring step is compared with the reference value, i.e. the original value. In the case of a composite member which is installed as a component part, in which the optional process 27 is completed, the original value, or reference value, against which the new result is compared may either be the result stored prior to installation at step 25, or that stored after installation at step 30. Of course, in an ideal situation, those two original values should be the same.

In order to compare the results, the processor obtains the serial number of the composite member 1 from the (e.g. user actuable) input device 11, and reads the reference value from the database stored for example in the cloud 13, and subtracts that result from the result of the repeated step 31. The result of this subtraction is then compared to a threshold amount in step 33, and if it is less than the threshold amount, it is determined that the composite member is in satisfactory condition.

In this case, as shown in step 34, the part remains installed and in service. And the flow chart returns to step 31, whereby the characterising steps of repeating the measurement and computing with a reference value continue to be repeated more than once, in accordance with a service schedule or until another incident, e.g. a crash, requires that the composite member 1 is retested.

On the other hand, if at step 33 it is determined that the result of subtracting the reference value from the test value is greater than the predetermined threshold amount, then the composite member 1 is identified as defective step 35 determines that the part requires repair or replacement. In the case of a composite member 1 which is not a component part, this will be the final step, the composite member 1 will be disposed of, or repaired, and if repaired it will be treated as a new component returning to step 21.

In the case of a composite member according to the present embodiment, which is a component part of a vehicle, such as an automobile, a new part (or the repaired part) will be fitted to the vehicle at step 36. This new/repaired composite member 1, will of course have been tested in accordance with steps 21-26 and have had a reference value stored against its serial number.

The new/repaired part will then be tested in a similar fashion as conducted in optional process 27, whereby, in step 37 the composite member 1 is once again connected to the test apparatus 5.

Thereafter, in step 38, the leak performance of the component is measured once again. The same process that was carried out before installation in the vehicle is carried out again: that is to say, to measure the leak performance, the processor 10 sends a signal via the communications unit 9 to the compressor 6 to cause it to pump compressed fluid, in this case air, into the component 1, simultaneously the processor 10 monitors the pressure in the component as sensed by the sensor 7 and, once a predetermined pressure $P_1$ is reached (whereby a pressure differential between the cavity and the surrounding air pressure has been generated), the processor 10 sends a signal to the compressor 6 causing it to cease from pumping air into the composite member 1. The test apparatus 5 then monitors the rate of change of the pressure differential over a first predetermined period $T_1$. The rate of change may again be obtained by subtracting the pressure $P_5$ at the end of the predetermined period from the predetermined pressure $P_1$ at the start of the predetermined period and dividing by the predetermined period $T_1$.

Then, at step 39, the test result is recorded and referenced to the vehicle as well as the serial number of the part. Thus, an operator may, for example, scan an RFID tag associated with the vehicle and having the vehicle's VIN and/or an internal serial number associated with it, or the test apparatus may be provided with an appropriate sensor as an input device 11 to read this information and the result of the test may be uploaded to a database stored for example in an intranet or cloud 13 as a reference value.

A further optional step in the optional process 27, not shown in FIG. 4 may also be carried out after step 38, whereby the result of the leak detection test carried out at step 38 on the installed component is compared to the result of the initial testing carried out before installation and, if the results differ by more than a predetermined amount, it is determined that the component has been damaged during installation and is rejected and removed from the vehicle to be replaced by a new component, which will have been tested in the same way.

The composite member 1 is then put into active use once again and the cycle of testing, steps 31-34, continues indefinitely.

Additionally and not mentioned in the flow sheet in FIG. 4, further tests may be conducted prior to installing the component at step 26, or even prior to conducting the test at step 21, in order to ensure that the components are satisfactory in areas where existing damage, caused e.g. by defects in the manufacturing process may not be detected by the test carried out at step 23. Such tests include x-ray and/or laser shearography, both of which are well known to those skilled in the art of testing composite materials.

As set out above, in view of the fact that the cavity 2 formed in the composite member 1 is only for testing purposes and fluid-tightness is not an essential function of many composite members 1, which may be formed of materials which are inherently permeable, there can be a wide variation of initial leakage. Accordingly, carrying out subsequent tests to check the fluid-tightness against the original fluid-tightness provides a much better indication of whether the composite member is damaged than checking against an arbitrary threshold for fluid-tightness and provides a much better indication of whether the structural integrity of the composite member has deteriorated between the point of original testing and the point of repetition.

The above embodiment is described by way of example only. Many variations are possible without departing from the scope of the invention as defined in the appended claims.

The invention claimed is:

1. A method of assessing damage to a composite member comprising:
 a. providing a composite member comprising at least one cavity;
 b. establishing a first pressure differential between the at least one cavity and a surrounding ambient pressure;
 c. monitoring a rate of change of the first pressure differential over a first predetermined period; and
 d. allowing the first pressure differential to subside such that pressure in the cavity becomes equal to the surrounding ambient pressure; the method characterised by
 e. storing a result of the monitoring step as a reference value for said composite member; and
 f. repeating the steps of establishing a pressure differential between the at least one cavity of said composite member and the surrounding ambient pressure;
 g. repeating monitoring a rate of change of a pressure differential over a second predetermined period, thus defining a second pressure differential;
 h. allowing the second pressure differential to subside such that pressure in the cavity becomes equal to the surrounding ambient pressure; and
 i. comparing the result of the repeated monitoring step for said composite member with the reference value for said composite member; and
 j. if the result of the repeated monitoring step differs from the reference value by more than a predetermined amount, determining that the composite member is defective.

2. The method according to claim 1 further comprising carrying out one or more additional checks on the acceptability of the composite member before monitoring the rate of change of the first pressure differential over the first predetermined period; wherein the one or more additional checks are selected from the group consisting of x-ray; laser shearography; and by measuring a rate of pressure increase when establishing a first pressure differential between the at least one cavity and the surrounding ambient pressure, establishing a reference value for the rate of pressure increase, by monitoring the rate of pressure increase over a predetermined period as a compressed fluid is introduced into the component to establish the first pressure differential, and comparing the rate of establishing a first pressure differential with the previously established reference value for establishing the first pressure differential.

3. The method according to claim 1 wherein the second pressure differential is the same as the first pressure differential and the second predetermined period is the same as the first predetermined period.

4. The method according to claim 1 comprising putting the composite member into active use after storing the reference value and before repeating the steps of establishing a pressure differential between the at least one cavity and the surrounding ambient pressure; monitoring the rate of change of the pressure differential over the second predetermined period; and comparing the result of the repeated monitoring step with the reference value.

5. The method according to claim 1 wherein the composite member is involved in an incident prior to repeating the steps of establishing a pressure differential between the at least one cavity and the surrounding ambient pressure; monitoring the rate of change of the second pressure differential over the second predetermined period; allowing the second pressure differential to subside; comparing the result of the repeated monitoring step with the reference value; and if the result of the repeated monitoring step differs from the reference value by more than a predetermined amount, determining that the composite member is defective.

6. The method according to claim 5 wherein the composite member is a component of a vehicle and the incident is a crash.

7. The method according to claim 1 wherein the composite member is a component of an automobile.

8. The method according to claim 1 comprising waiting at least one day after storing the reference value and before repeating the steps of establishing a pressure differential between the at least one cavity and the surrounding ambient pressure; monitoring the rate of change of the second pressure differential over the second predetermined period; and comparing the result of the repeated monitoring step with the reference value.

9. The method according to claim 1 wherein steps f to j are repeated according to a service schedule.

10. The method according to claim 9 wherein steps f to j are repeated more than once, in accordance with the service schedule.

11. The method according to claim 1 wherein the composite member is put into service for a predetermined time prior to repeating the steps of establishing a pressure differential between the at least one cavity and the surrounding ambient pressure; monitoring the rate of change of the second pressure differential over the second predetermined period; allowing the second pressure differential to subside; comparing the result of the repeated monitoring step with the reference value; and if the result of the repeated monitoring step differs from the reference value by more than a predetermined amount, determining that the composite member is defective, wherein steps f to j are performed after a vehicle comprising the composite member has travelled a predetermined number of miles.

12. The method according to claim 1 comprising conducting the steps of claim 1 on a plurality of composite members, and associating each reference value with a unique ID associated with each respective one of the plurality of composite members.

13. The method according to claim 12 further comprising the step of comparing the reference value to a threshold value and if it exceeds the threshold value, rejecting the respective component for use.

14. The method according to claim 1 comprising the step of determining that the composite member is defective if the reference value exceeds a predetermined absolute threshold value.

15. The method according to claim 1 further comprising the steps of, after storing the result of the monitoring step as a reference value, installing the composite member as a component part of a vehicle, and storing the reference value in a database associated with the vehicle in which the part is installed.

16. The method according to claim 1 comprising the steps of: establishing a first pressure differential between the at least one cavity and the surrounding ambient pressure; monitoring the rate of change of the first pressure differential over the first predetermined period; and allowing the first pressure differential to subside; and storing the result of the monitoring step as a reference value prior to installation of the composite member in a vehicle and/or after installation in a vehicle.

17. The method according to claim 1 further comprising the steps of repairing or replacing a defective component comprising a cavity; and establishing a first pressure differential between the at least one cavity in the replaced/repaired component and the surrounding ambient pressure; monitoring the rate of change of the first pressure differential over the first predetermined period; and allowing the first pressure differential to subside; and storing the result of the monitoring step as a new reference value.

18. The method according to claim 17 further comprising repeating the steps of establishing a pressure differential between the at least one cavity and the surrounding ambient pressure; monitoring the rate of change of the second pressure differential over the second predetermined period; and allowing the second pressure differential to subside; then comparing the result of the repeated monitoring step with the new reference value; and if the result of the repeated monitoring step differs from the reference value by more than a predetermined amount, determining that the composite member is defective.

19. The method according to claim 1 wherein forming the cavity comprises forming a cavity in a region where damage to the composite member would be critical to its safe function.

20. A test apparatus comprising a connector for connection to an opening of a cavity of a composite member, apparatus for creating a pressure differential between the cavity and the surrounding environment, a sensor for sensing a change in pressure differential, and a processor adapted to implement a method of assessing damage to a composite member comprising:
   a. providing a composite member comprising at least one cavity;
   b. establishing a first pressure differential between the at least one cavity and a surrounding ambient pressure;
   c. monitoring the rate of change of the first pressure differential over a first predetermined period; and
   d. allowing the pressure differential to subside such that pressure in the cavity becomes equal to the surrounding ambient pressure; the method characterised by
   e. storing the result of the monitoring step as a reference value for said composite member; and
   f. repeating the steps of establishing a pressure differential between the at least one cavity of said composite member and the surrounding ambient pressure;
   g. repeating monitoring the rate of change of the pressure differential over a second predetermined period, thus defining a second pressure differential;

h. allowing the second pressure differential to subside such that pressure in the cavity becomes equal to the surrounding ambient pressure; and
i. comparing the result of the repeated monitoring step for said composite member with the reference value for said composite member; and
j. if the result of the repeated monitoring step differs from the reference value by more than a predetermined amount, determining that the composite member is defective.

* * * * *